(12) United States Patent
Lin

(10) Patent No.: US 12,108,430 B2
(45) Date of Patent: Oct. 1, 2024

(54) WIRELESS COMMUNICATION METHOD, NETWORK DEVICE AND TERMINAL DEVICE

(71) Applicant: GUANGDONG OPPO MOBILE TELECOMMUNICATIONS CORP., LTD., Dongguan Guangdong (CN)

(72) Inventor: Hao Lin, Neuilly sur Seine (FR)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 391 days.

(21) Appl. No.: 17/561,290

(22) Filed: Dec. 23, 2021

(65) Prior Publication Data
US 2022/0124725 A1  Apr. 21, 2022

Related U.S. Application Data

(63) Continuation of application No. PCT/IB2019/000947, filed on Aug. 26, 2019.

(51) Int. Cl.
*H04W 16/28* (2009.01)
*H04L 5/00* (2006.01)
(Continued)

(52) U.S. Cl.
CPC ......... *H04W 72/542* (2023.01); *H04L 5/0051* (2013.01); *H04W 16/28* (2013.01);
(Continued)

(58) Field of Classification Search
CPC . H04W 72/23; H04W 16/28; H04W 72/0446; H04L 5/0051
(Continued)

(56) References Cited

U.S. PATENT DOCUMENTS

2008/0267269 A1\* 10/2008 Enescu ................. H04L 1/0079
375/260
2019/0037481 A1  1/2019 Zhang et al.

FOREIGN PATENT DOCUMENTS

EP      3322113 A1    5/2018
WO   2019143937 A1    7/2019
WO   2019157091 A1    8/2019

OTHER PUBLICATIONS

International Search Report (ISR) dated May 20, 2020 for Application No. PCT/IB2019/000947.
(Continued)

*Primary Examiner* — Dang T Ton
(74) *Attorney, Agent, or Firm* — Ladas & Parry LLP

(57) ABSTRACT

A method for assessing a quality state of a radio link between a user equipment and a base station, comprising: obtaining a signal index that identifies within a reference signal discovery window a plurality of candidate time slots during which a reference signal may be sent by the base station; determining whether the base station was authorized, as a result of a procedure that determines the availability of a radio channel, to access to the radio channel during at least one first frame, wherein the determination is based on the reception or absence of reception during said at least one first frame of a downlink configuration signal from the base station; identifying, among the plurality of candidate time slots, a target time slot; assessing the quality state of the radio link on the basis of a power measurement performed during the target time slot only if the determination is positive.

14 Claims, 5 Drawing Sheets

(51) Int. Cl.
H04W 72/0446 (2023.01)
H04W 72/23 (2023.01)
H04W 72/542 (2023.01)
H04W 74/0816 (2024.01)

(52) U.S. Cl.
CPC ....... *H04W 72/0446* (2013.01); *H04W 72/23* (2023.01); *H04W 74/0816* (2013.01)

(58) Field of Classification Search
USPC .................. 370/329, 400, 401, 402, 405
See application file for complete search history.

(56) References Cited

OTHER PUBLICATIONS

SONY:"Considerations on initial access and mobility for NR unlicensed operations", 3GPP Draft; R1-1810634_INITIAL_Access, 3rd Generation Partnership Project (3GPP), Mobile Competence Centre; 650, Route Des Lucioles; F-06921 Sophia-Antipolis Cedex; France, vol. RAN WG1, No. Chengdu, China; Oct. 8, 2018-Oct. 12, 2018 Sep. 28, 2018(Sep. 28, 2018), XP051518040.

SONY:"Enhancements to initial access procedures for NR-U", 3GPP Draft; R1-1902170_IA_Procedure, 3rd Generation Partnership Project (3GPP), Mobile Competence Centre; 650, Route Des Lucioles; F-06921 Sophia-Antipolis Cedex; France, vol. RAN WG1, No. Athen, Greece; Feb. 25, 2019-Mar. 1, 2019 Feb. 16, 2019(Feb. 16, 2019), XP051599865.

Intel Corporation: "Enhancements to initial access and mobility for NR-unlicensed", 3GPP Draft; R1-1902472 Intel Initial Access Procedure, 3rd Generation Partnership Project (3GPP), Mobile Competence Centre; 650, Route Des Lucioles; F-06921 Sophia-Antipolis Cedex; France, vol. RAN WG1, No. Athens, Greece: Feb. 25, 2019-Mar. 1, 2019 Feb. 16, 2019(Feb. 16, 2019), XP051600168.

* cited by examiner

WIRELESS COMMUNICATION METHOD, NETWORK DEVICE AND TERMINAL DEVICE

CROSS-REFERENCE TO RELATED APPLICATIONS

This application is a continuation of International Application No. PCT/IB2019/000947, filed on Aug. 26, 2019, which is hereby incorporated by reference in their entireties.

TECHNICAL FIELD

The present disclosure relates to relates to the field of telecommunications and in particular to a method and device for radio link monitoring and a method and device for radio link quality assessment.

The present disclosure is for example applicable to a telecommunication system such as a 5G (fifth generation) network using the 5G NR (New Radio) as radio access technology (RAT) defined by 3GPP. The present disclosure is applicable to 5G NR-U (NR in unlicensed spectrum) but also to 5G NR (NR in licensed spectrum).

BACKGROUND

According to the current version of the 3GPP 5G standard concerning the new radio unlicensed spectrum (see e.g. 3GPP TS 38.213, 38.133, Release 15), a base station (BS) may configure a user equipment (UE) to monitor the quality of the link (link quality) between the UE and the base station based on a reference signal. e.g. a SSB signal (SS/PBCH block signal, or Synchronisation Signal/Physical Broadcast Channel block signal), that is sent by the base station inter alia for quality evaluation. The base station may send a succession of SSB signals during respective time slots. Each SSB signal complies with a respective set of beamforming parameters. Accordingly, a SSB signal has a direction corresponding a beamforming direction used by the BS for one or more UEs. Each SSB signal is assigned a signal index (e.g. 0, 1, . . . N) that identifies the time slot during which the corresponding SSB signal is sent by the base station. For a given beamforming direction, one or more SSB signals may be sent during corresponding time slots in the evaluation window. The UE measures the link quality based on the SSB signals received by the UE during the evaluation window. Depending on the position of the UE with respect to the base station and the direction of the SSB signal, the UE may detect only some of the SSB signals.

The base station (BS) configures initially the UE by sending several parameters including: a SSB index, the periodicity of the link quality assessment; the evaluation period; and in-sync and out-sync thresholds. Among them, the SSB index identifies which SSB signals (i.e. during which time slots) the UE should use to measure the link quality. The link quality assessment periodicity controls the periodicity with which the UE reports the quality state from the physical layer to the higher layer (MAC layer, Medium Access Control layer) in the UE. The quality state may be "in-sync" if the quality of the link is sufficient for successful communication with a given success rate (e.g. 80%) or "out-of-sync" if the quality of the link is not sufficient. The evaluation period defines a time window in which all the configured SSBs should be taken into account for this assessment.

In the NR-U systems defined by the 3GPP 5G standard, a Discovery Reference Signal (DRS) window is defined for implementing the assessment of the quality of a link. The time duration and periodicity of this window are configurable. Within the DRS window there are a set of SSB candidate temporal positions (i.e. candidate time slots), and the number of the SSB candidate temporal positions is depending on the subcarrier spacing. In some implementation, the SSB-based RLM (Radio Link Monitoring) measurement may be restricted to the DRS window.

FIG. 1A shows the temporal relationship between the evaluation period, the reporting period and the DRS window during which several SSB signals may be transmitted during respective time slots.

FIG. 1B shows the temporal relationship between the DRS window and a set of SSB candidate time slots, which in this example are all within the DRS window. Each of the SSB time slots that falls within the DRS window is used for the SSB-based measurement. For each time slot matching the configured SSB index, the UE estimates a Reference Signal Received Power (RSRP) and to compare with the in-sync and out-sync threshold. The result is used as 1 radio link quality measurement sample. In the example of FIG. 1B, the dark squares represent time slots (here the 5th to 8th time slot) during which a SSB signal was actually emitted, while the light squares represent time slots during which no SSB signal was transmitted.

At the end of the reporting period, the UE have to assess the link quality. The assessment performed by the UE takes into accounts all the SSB measurements performed during the latest evaluation period based on the received SSB signals. If there is at least one SSB measurement for which the estimated SSB Reference Signal Received Power (RSRP) is above the in-sync threshold, the UE assesses "in-sync" state. On the other hand, if for all the SSB measurements performed during the latest evaluation period, the estimated SSB RSRP is below the out-sync threshold, the UE assesses "out-sync" state.

In the NR-U systems, prior to a transmission, a candidate device that has to send a signal to another device has to implement a LBT (Listen Before Talk) procedure and the LBT outcome determines to which candidate device the actual transmission is granted for the next frame. As a consequence, in the current quality link evaluation mechanism, there is an ambiguity about the effective sending of an SSB signal at one or more configured SSB index (i.e. time slots) as the effective sending is dependent on the outcome of the LBT procedure.

One example is that at the configured SSB index, if the UE measures a very bad link quality, this does not necessarily mean that the link quality is bad but also could be a case in which the base station is not granted access to the channel as the result of the LBT performed by the base station, thus no SSB signal is effectively sent at this configured index.

There appears thus a need to improve the situation with respect to this ambiguity.

SUMMARY

The scope of protection sought for various embodiments of the disclosure is set out by the independent claims. The various embodiments/examples, aspects and features, if any, described in this specification that do not fall under the scope of the independent claims are to be interpreted as examples useful for understanding various embodiments of the disclosure.

According to a first aspect, there is provided a method for assessing by a user equipment a quality state of a radio link between the user equipment and a base station. The method comprises: obtaining a signal index that identifies within a reference signal discovery window a plurality of candidate time slots during which a reference signal may be sent by the base station; determining whether the base station was authorized, as a result of a procedure that determines the availability of a radio channel, to access to the radio channel during at least one first frame, wherein the determination is based on the reception or absence of reception during said at least one first frame of a downlink configuration signal from the base station; identifying, among the plurality of candidate time slots, a target time slot; assessing the quality state of the radio link on the basis of a power measurement performed during the target time slot only if the determination is positive.

According to a second aspect, there is provided a device comprising means for performing a method for assessing a quality state of a radio link between a user equipment and a base station according to the first aspect. The means may comprise at least one processor and at least one memory including computer program code, wherein the at least one memory and computer program code are configured to, with the at least one processor, cause the device to perform one or more steps of the method. The means may comprise circuitry configured to perform one or more steps of the method.

There is also provided a user equipment comprising: a receiver configured to receive one or more downlink configuration signals and one or more reference signals from a base station; a power measurement circuitry configured to measure power of a reference signal received from the base station; and a device according to the second aspect.

According to a third aspect, there is provided a method for performing radio link monitoring by base station. The method comprises: configuring a user equipment with a signal index that identifies within a reference signal discovery window a plurality of candidate time slots during which a reference signal may be sent by the base station; determining whether the base station is authorized, as a result of a procedure that determines the availability of a radio channel, to access to the radio channel during at least one first frame; identifying, among the plurality of candidate time slots, a target time slot: if the determination is positive, sending to the user equipment during said at least one first frame a downlink configuration signal and sending after the downlink configuration signal a reference signal in the direction of the user equipment only during the target time slot.

According to a fourth aspect, there is provided a device comprising means for performing a method according to the third aspect. The means may comprise at least one processor and at least one memory including computer program code, wherein the at least one memory and computer program code are configured to, with the at least one processor, cause the device to perform one or more steps of the method. The means may comprise circuitry configured to perform one or more steps of the method.

There is also provided a base station comprising: a transmitter configured to send one or more downlink configuration signals and one or more reference signals and a device according to the fourth aspect.

According to a fifth aspect, there is provided a computer readable medium comprising program instructions stored thereon for causing a device to perform the steps of the method according to the first aspect or third aspect. The computer readable medium may be a non-transitory computer readable medium.

The present disclosure may find application in radio network with unlicensed spectrum (also referred to as NR-U in the context of the 3GPP standard). More generally, the present disclosure may find application in any other radio network in which a user equipment measure the quality of a link on the physical layer based on one or more reference signals received from a base station during specific time slots of an evaluation period.

BRIEF DESCRIPTION OF THE DRAWINGS

Some embodiments are now described, by way of example only, and with reference to the accompanying drawings, in which.

DESCRIPTION OF EMBODIMENTS

Figure 1A:
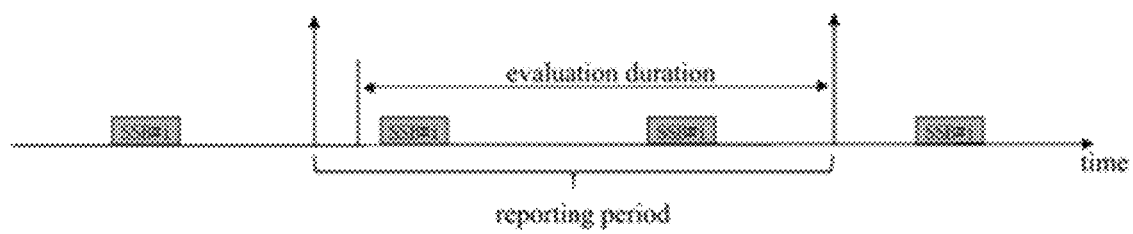
FIG. 1A, already described, shows the temporal relationship between the evaluation period, the reporting period and the DRS window.
Figure 1B:
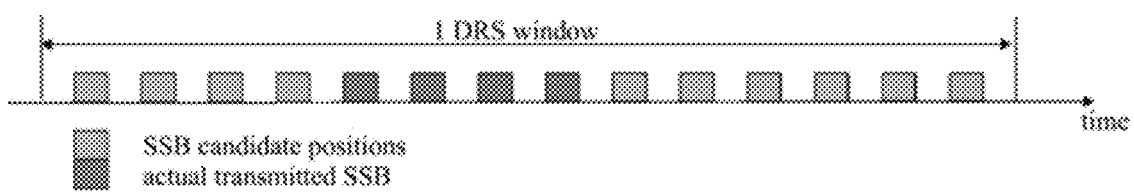
FIG. 1B, already described, shows the temporal relationship between the DRS window and a set of SSB candidate time slots.

Example embodiments will be described below with reference to functions, engines, block diagrams, flow diagrams, state transition diagrams and/or flowcharts illustrating methods, apparatuses, systems, computer programs, and computer readable mediums according to one or more exemplary embodiments.

It should be appreciated by those skilled in the art that any functions, engines, block diagrams, flow diagrams, state transition diagrams and/or flowcharts herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processing apparatus, whether or not such computer or processor is explicitly shown.

Each described function, engine, block, step can be implemented in hardware, software, firmware, middleware, microcode, or any suitable combination thereof. If implemented in software, the functions, engines, blocks of the block diagrams and/or flowchart illustrations can be implemented by computer program instructions/software code, which may be stored or transmitted over a computer-readable medium, or loaded onto a general purpose computer, special purpose computer or other programmable processing apparatus and/or system to produce a machine, such that the computer program instructions or software code which execute on the computer or other programmable processing apparatus, create the means for implementing the functions described herein.

In the following, functional blocks denoted as "means configured to perform . . . " (a certain function) shall be understood as functional block(s) comprising circuitry that is adapted for performing or configured to perform a certain function. Moreover, any entity described herein as "means", may correspond to or be implemented as "one or more modules", "one or more devices", "one or more units", etc. Means for performing one or more functions may also comprises at least processor and at least one memory (e.g. in a system or apparatus) for storing computer program code configured to, with the at least one processor, cause the performance (by the system or apparatus) of the one or more functions.

When provided by a processor, the functions may be provided by a single dedicated processor, by a single shared processor, or by a plurality of individual processors, some of which may be shared. The functions of the various elements shown in the figures, including any functional blocks labeled as "processors", may be provided through the use of dedicated hardware as well as hardware capable of executing software in association with appropriate software.

Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

As used in this description, the term "circuitry" may refer to (a) hardware-only circuit implementations; (b) combinations of circuits and software (and/or firmware); or (c) hardware circuit(s) and/or processor(s), such as a microprocessors or a portion of a microprocessor(s), that require or not software (e.g. firmware) for operation, whether the software or firmware is or not physically present.

This definition of circuitry applies to all uses of this term in this disclosure, including in any claims. The term circuitry also covers, for example and if applicable to the particular claimed element, a baseband integrated circuit, processor integrated circuit or a similar integrated circuit for a base station and/or user equipment.

Generally, the present disclosure relates to methods and corresponding devices for radio link monitoring and for assessing a quality state of a radio link between a user equipment and a base station.

The methods described herein provide a way of removing the ambiguity in a link quality measurement as a bad quality may be due to either a perished link quality or an absence of reference signal transmission due to an absence of authorization to access to the radio medium for the base station. This makes the radio link monitoring more accurate and reliable. The principle is that the radio link monitoring measurement can be assisted by some other signal/channel/indication.

The methods described herein may be applied to the 5G NR non-licensed band communications in which a signal/channel assisted radio link monitoring (RLM) method is applied within the Discovery Reference Signal (DRS) window. The present disclosure relates more specifically to methods for radio link monitoring (RLM) and/or quality state assessment on the basis of SS/PBCH Block (SSB) in one or more unlicensed spectral bands. The methods uses downlink signal/channel to assist the User Equipment (UE) to process the RLM. This makes the RLM more accurate and reliable.

Figure 2:
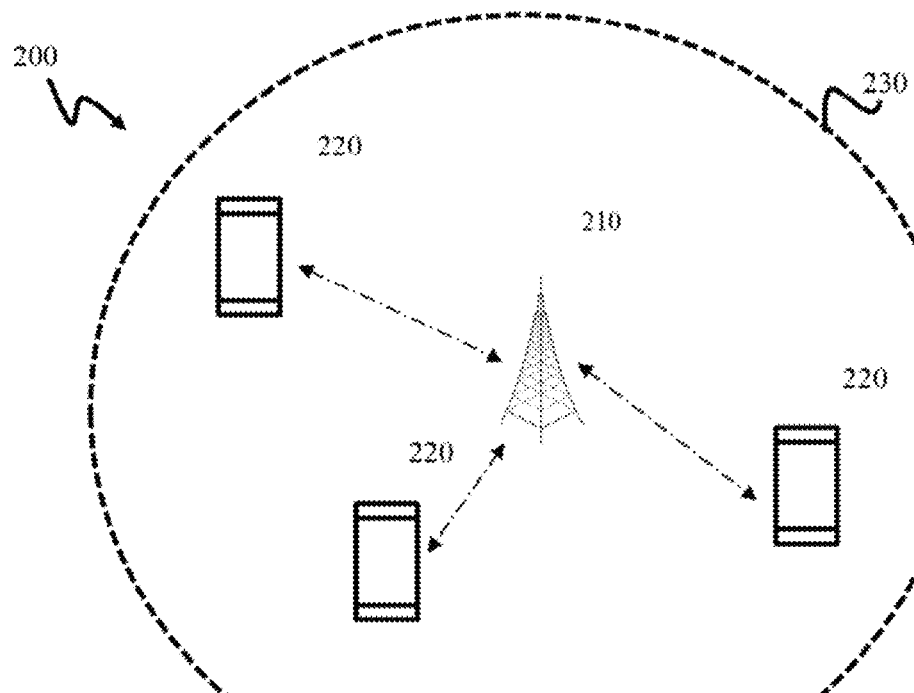
FIG. 2 represents schematically a communication system in which one or more disclosed embodiments may be implemented.

FIG. 2 depicts an example system 200, in accordance with some example embodiments. The system 200 includes a base station 210 and one or more user equipments 220 with the radio cell coverage of the base station. In this example, the base station 210 may be configured in accordance with 5G (having for example an NR, new radio, air interface) or LTE. Although some of the examples herein refer to certain types of base stations, such as 5G and LTE base stations, other types of base stations, including femtocell base stations, home eNB base station, picocell base station, small cell base stations, and/or other radio access points may be used as well. Moreover, although some of the examples herein refer to certain types radio access technologies, such as 5G, NR, and LTE, other types of radio technologies may be used as well.

Figure 3A:
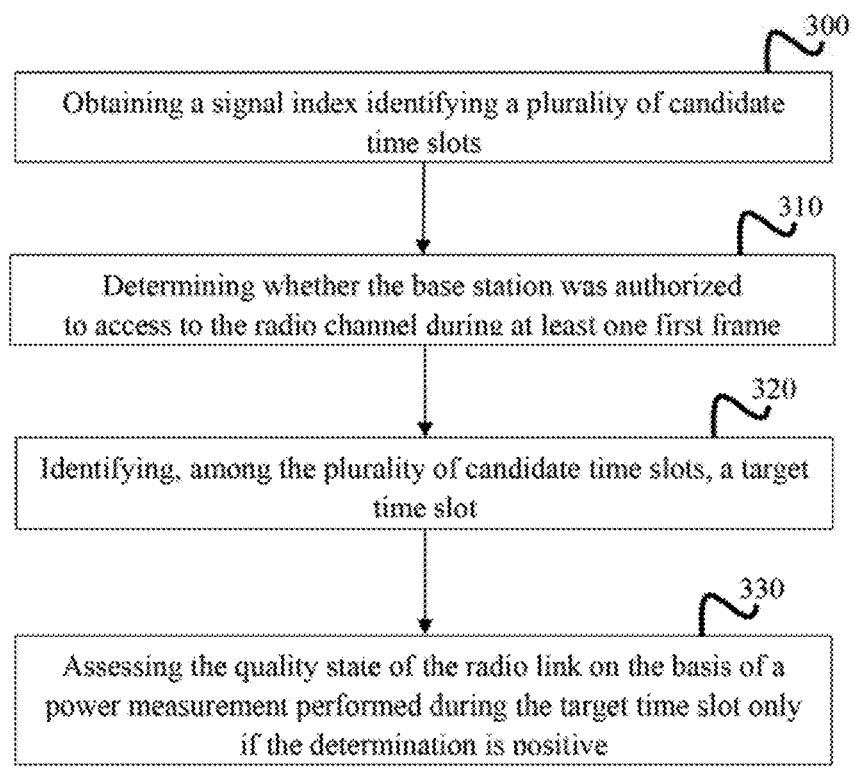
FIG. 3A is a flowchart of an example embodiment of a method for assessing a quality state of a radio link between a user equipment and abase station.

FIG. 3A is a flowchart of an example method for assessing a quality state of a radio link between a user equipment and a base station.

The steps of the method may be implemented by a device included in a user equipment according to any example described herein. The user equipment is served by a base station in a radio network.

While the steps are described in a sequential manner, the man skilled in the art will appreciate that some steps may be omitted, combined, performed in different order and/or in parallel.

In step 300, a signal index is obtained. The signal index may be obtained from the base station during an initial configuration of the user equipment. The signal index identifies, within a reference signal discovery window, a plurality of candidate time slots during which a reference signal may be sent by the base station.

In the context of 3GPP NR-U, the reference signal may be a Synchronization Signal/Physical Broadcast Channel (SS/PBCH) block signal (SSB signal). The signal index may be the SSB index configured by the base station. The candidate time slots thus correspond to time slots and/or SSBs associated with this SSB index. The candidate time slots may be time slots that are used by the base station to send a reference signal having a given beamforming direction. This beamforming direction corresponds to the position of the user equipment with respect to the base station.

In step 310, the user equipment determines whether the base station was authorized, as a result of a procedure that determines the availability of a radio channel, to access to the radio channel during at least one first frame. This determination is based on the reception or absence of reception during said at least one first frame of a downlink configuration signal from the base station.

The procedure that determines the availability of a radio channel may be for example a Listen Before Talk or Listen Before Transmit procedure or any another mechanism for determining the availability of a radio channel and/or granting access to a radio channel.

In the context of 3GPP NR-U the downlink configuration signal may for example be a Group-Common Slot Format Indication (GC-SFI) signal or a Downlink Control Information (DCI) signal or any other downlink configuration signal from the base station.

In step 320, a target time slot is identified among the plurality of candidate time slots. This target time slot will be used by the base station to transmit a reference signal and the user equipment will perform the power measurement during this target time slot. There is thus an agreement between the base station and the user equipment based on the target time slot such that, during the reference signal discovery window, 1) the base station will transmit only one reference signal during the identified target time slot and 2) the user equipment, which expects to receive the reference signal during this target time slot, will perform the assessment of the quality state only for this target time slot. In some embodiments, the user equipment may perform power measurement for one or more time slots others than the target time slot, but the target time slot corresponds to the only valid time slot that can be used for quality assessment.

The identification of the target time slot may be performed in various ways. The target time slot may be predetermined before the start of the DRS window and/or the evaluation period, or may determined as a function of one or more signals received by the user equipment from the base station and/or as a function of the temporal relationships between the candidate time slots and one or more signals received by the user equipment from the base station. For example, the identification of the target time slot may be performed based on at least one of a downlink configuration signal, a predetermined processing time, a selection indication and a channel occupancy time. The downlink configuration signal may be a Group-Common Slot Format Indication (GC-SFI) signal or a Downlink Control Information (DCI) signal. Several examples will be described below by reference to FIGS. 4A to 4D respectively.

In step 330, the quality state of the radio link is assessed by the user equipment. The assessment of the quality state is performed only if the determination performed in step 310 is positive. The assessment is performed on the basis of the power measurement performed during only one target time slot, which is the target time slot identified in step 320.

Figure 3B:
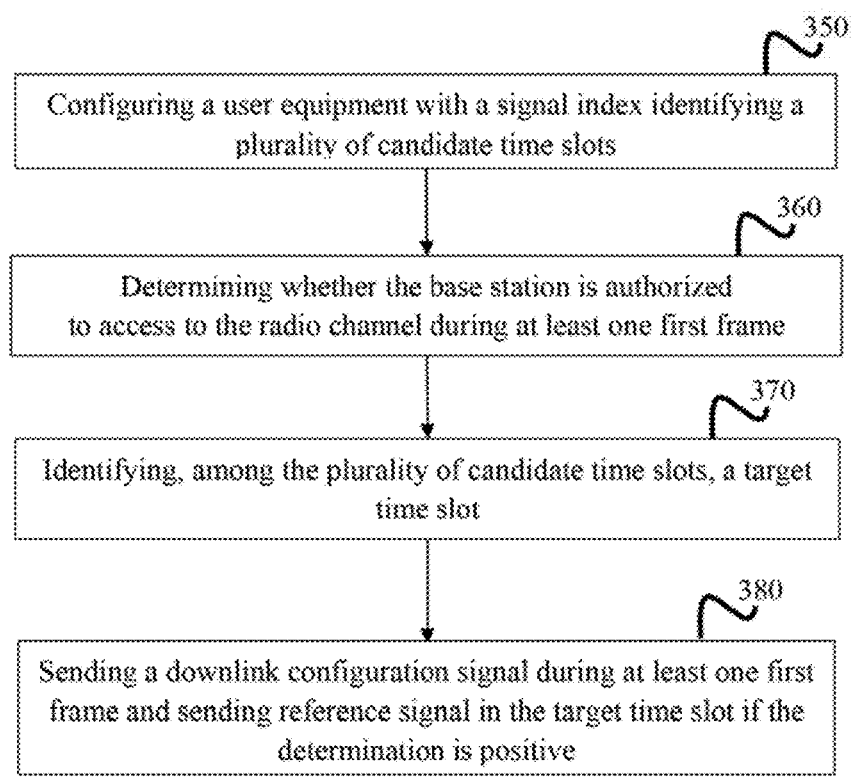
FIG. 3B is a flowchart of an example embodiment of a method for radio link monitoring by a base station.

FIG. 3B is a flowchart of an example method for radio link monitoring by a base station.

The steps of the method may be implemented by a device included in a base station according to any example described herein. The base station serves one or more user equipment in a radio network. The method steps 350 to 390 are counterparts performed on base station side of the method steps 300 to 330 performed on user equipment side. As a consequence, the details, examples and explanations provided for steps 30) to 330 will not be repeated here.

While the steps are described in a sequential manner, the man skilled in the art will appreciate that some steps may be omitted, combined, performed in different order and/or in parallel.

In step 350, a user equipment is configured by the base station with a signal index that identifies within a reference signal discovery window a plurality of candidate time slots during which a reference signal may be sent by the base station.

In step 360, the base station determines whether the base station is authorized, as a result of a procedure that determines the availability of a radio channel, to access to the radio channel during at least one first frame.

In step 370, the base station identifies, among the plurality of candidate time slots, a target time slot. This target time slot will be used by the base station to transmit a reference signal and the user equipment will perform the power measurement during this target time slot. As already explained, them is an agreement between the base station and the user equipment based on the target time slot such that, during the reference signal discovery window, 1) the base station will transmit only one reference signal during the identified target time slot and 2) the user equipment, which expects to receive the reference signal during this target time slot, will perform the power measurement only during this target time slot.

The identification of the target time slot may be performed in various ways. For example, the identification of the target time slot may be performed based on at least one of a downlink configuration signal, a predetermined processing time, a selection indication and a channel occupancy time. The downlink configuration signal may be a Group-Common Slot Format Indication (GC-SFI) signal or other Downlink Control Information (DCI) signals. Several examples will be described below by reference to FIGS. 4A to 4D respectively.

In step 380, if the determination performed at step 360 is positive, the base station sends to the user equipment, during said at least one first frame, a downlink configuration signal. In step 380, if the determination performed at step 360 is positive, the base station also sends, after the downlink configuration signal, a reference signal in the direction of the user equipment. Only one reference signal is sent during the target time slot identified in step 360.

Several methods for the identification of a target time slot (step 320 and step 370) to be used for power measurement will be described by reference to FIGS. 4A to 4D in the context of 3GPP NR-U. The reference signal discovery window may correspond here to the DRS window in which there are a set of SSB candidate positions/candidate time slots associated with the signal index configured for the UE, whose QCL (quasi co-located) relations among them are known to the UE.

For example, as illustrated by FIGS. 4A to 4D, the candidate time slots associated with a same signal index have the same legend. The candidate time slots 0, 4, 8, 12 represented by squares filled with horizontal section lines share a same signal index equal to 0. Similarly, the candidate time slots 1, 5, 9, 13 represented by squares filled with vertical section lines, share a same signal index equal to 1. Similarly, the candidate time slots 2, 6, 10 represented by squares filled with section lines inclined 45 degrees, share a same signal index equal to 2. Similarly, the candidate time slots 3, 7, 11 represented by squares filled with section lines inclined 135 degrees, share a same signal index equal to 3. The candidate time slots associated with a same signal index are said to be QCL related.

First Example

According to a first example, the target time slot is identified (step 320 and step 370) as the earliest candidate time slot that occurs after a predetermined processing time after the receipt of the downlink configuration signal. This first example is illustrated by FIGS. 4A and 4B.

In this first example, the downlink configuration signal which is used to assist the radio link monitoring via power measurement is the group-common SFI (GC-SFI). The GC-SFI signal is transmitted to the UE in the GC-PDCCH (Physical Downlink Control Channel) with DCI format 2_0. We assume here that if the GC-SFI can be sent, it will always be sent within the DRS window. The GC-SFI can be used to assist the UE identify the target time slot during which the actual SSB for RLM measurement should be sent. The UE is initially configured (step 300) by the higher layer with the SSB index (i.e. the signal index) for the RLM. For example, in FIG. 4A the signal index is equal to 3 and the candidate time slots corresponds to SSB index 3, 7, 11. Before the DRS window starts or during the DRS window, if the UE receives the GC-SFI signal, it implies that the BS has been granted access to the radio medium after the LBT procedure. Then we can have two cases: 1) the GC-SFI arrives before the first time slot 3 corresponding to the configured SSB index (see FIG. 4A), and the actual transmitted SSB is sent during this first time slot: the target time slot is thus this first time slot; or 2) the GC-SFI arrives later and the actual transmitted SSB is at the "earliest to come" SSB index (7 or 11) having the same QCL relation with the configured SSB index: the target time slot is here the first time slot after receipt of the GC-SFI.

Figure 4A:
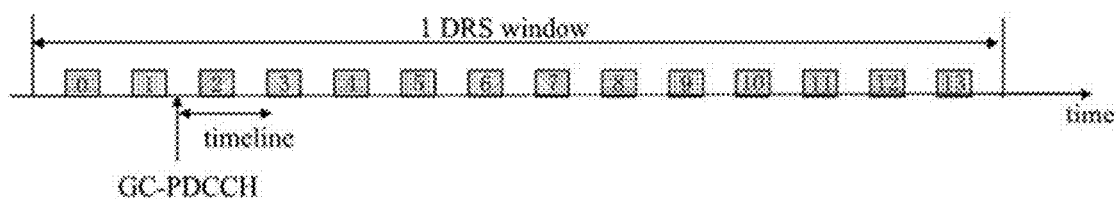
FIG. 4A to 4D show aspects of radio link monitoring and link quality assessment for a radio link between a user equipment and a base station according to examples.
Figure 4B:
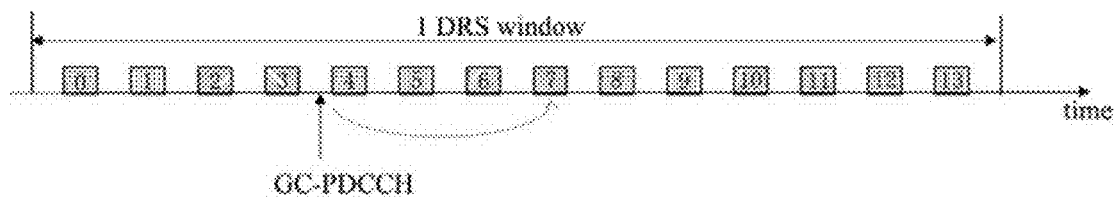

In FIG. 4A, we assume that there are 14 SSB candidate positions and 14 corresponding candidate time slots in the DRS window. The SSB index with the same legend have the same QCL relation. If the UE is configured to monitor SSB index 3 for RLM measurement, and when the GC-SFI arrives a certain time ahead SSB index 3, the UE will assume that the actual SSB transmission is at the configured SSB index, i.e. SSB index 3.

In order to anticipate the GC-SFI processing time, the time duration between the last symbol of the GC-SFI received by the UE and the first symbol of the SSB index 3 should be larger than or equal to the UE processing time. The value of the processing time may depend on the UE capability. On the other hand, if the GC-SFI arrives after SSB index 3 or the time duration between them does not satisfy the UE processing time, the UE will assume that the actually transmitted SSB is at the earliest SSB index having the same QCL relation with the SSB index 3 and at the same time verifying the UE processing timeline.

In the example of FIG. 4B, the GC-SFI signal arrives after the first candidate time slot corresponding to the configured SSB index such that the actual transmitted SSB will be at the next candidate time slot corresponding to SSB index 7. In case the UE does not receive GC-SFI during the DRS window, the UE assumes the SSB is not actually transmitted due to LBT failure. Thus, the UE will not perform any power measurement and also not assess the quality of the link nor report any quality assessment to higher level. The advantage of this solution is that there is no additional bit-field or data to be introduced in GC-SFI. In this example the SSB transmission by the base station is limited to a single SSB signal and the UE performs the power measurement only for the target time slot identified among the candidate time slots associated with the configured signal index.

Second Example

According to a second example, the target time slot is identified (step 320 and step 370) on the basis of a selection indication received with the downlink configuration signal. The target time slot is selected among the candidate time slots based on the selection indication after the receipt of the downlink configuration signal. The selection indication is used for dynamically identifying the target time slot to be used for power measurement.

It may happen that the target time slot selected on the basis of the selection indication occurs before a predetermined processing time has elapsed after the receipt of the downlink configuration signal. In such a situation, the target time slot to be used for power measurement is the next time slot among the candidate time slots that complies with the selection indication and occurs after a predetermined processing time after the receipt of the downlink configuration signal.

Figure 4C:
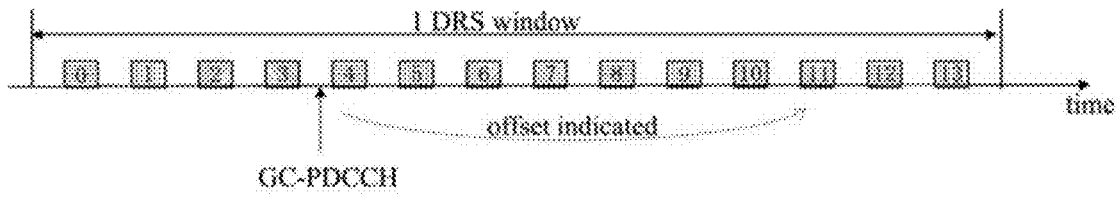

This second example is illustrated by FIG. 4C in the context of 3GPP NR-U. In this example the downlink configuration signal which is used to assist the radio link monitoring via power measurement is the group-common SFI (GC-SFI). The selection indication is for example an offset indication introduced in the GC-SFI signal. The number of bits for this offset indication may be semi-statically configured and may be based on the QCL relation among SSB index in the DRS window. In FIG. 4C, the maximum offset between QCL related SSB index is 4, meaning that the maximum value for the offset indication is 4 and 2 bits are necessary for encoding the offset indication. Once the UE detects the GC-SFI, the offset indication will tell UE in which target time slot the actual SSB will be transmitted. For example, if the configured SSB index is SSB index 3, the GC-SFI can indicate that the actual SSB is transmitted at the target time slot corresponding to SSB index 11 by sending an offset indication value equal to 3, meaning that among all the candidate time slots (i.e. all the QCL related SSB index having the configured signal index 3, i.e. among the SSB index 3, 7, 11) the third candidate time slot corresponding to SSB index 11 will actually carrier the SSB signal. In this example, the selection indication gives the number of the candidate time slot to be used for SSB transmission and power measurement.

Like in the first example, in case the UE does not receive GC-SFI during the DRS window, the UE assumes the SSB is not actually transmitted due to LBT failure. Thus, the UE will not perform any power measurement, will not assess the quality of the link nor report any quality assessment to higher level. The advantage of this solution compared to the first example is that the base station will not have a restricted time between the transmission of the GC-SFI signal and the transmission of the SSB. In the second example the SSB transmission by the base station is also limited to a single SSB signal and the UE performs the power measurement only for the target time slot identified among the candidate time slots associated with the configured signal index.

Third Example

Figure 4D:
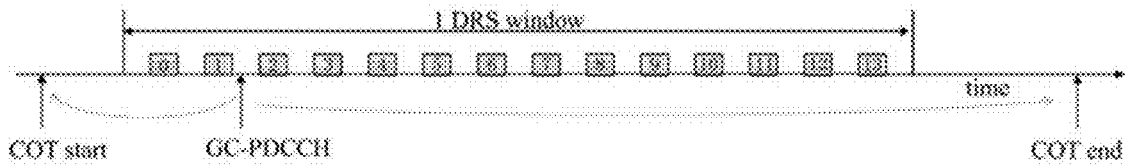

According to a third example, the target time slot is selected (step 320 and step 370) among the candidate time slots that fall within a channel occupancy time (COT). This third example is illustrated by FIG. 4D in the context of 3GPP NR-U. FIG. 4D shows GC-SFI assisted RLM using COT information. The target time slot may be the earliest candidate time slot that falls within the COT.

If the GC-SF monitoring signal is configured sparsely, it is highly probable that when the BS starts the COT, the next GC-SFI monitoring occasion is still far away as shown in FIG. 4D. Thus, it is a tight restriction to mandate the BS to send the actual SSB always after the GC-SFI. One solution is that to take advantage of the COT information in the GC-SFI (we presume that it contains such information indicating the COT start and COT end positions). In each DRS window, the UE measures the configured SSB index during the target time slot and the measured result will be confirmed to be valid when the UE receives the GC-SFI whose COT information indicates that the configured SSB index in the measured DRS window is inside the BS COT, i.e. between COT start and COT end. Otherwise, the measured result is confirmed to be invalid and the UE will not count the measurement result as in-sync or out-sync nor report any quality assessment to higher level. In this third example, not only does the GC-SFI include the COT information, but also it selects the target time slot among the candidate time slots. If the selected target time slot is in the COT, the UE measures only one selected target time slot;

otherwise, the UE selects the first time slot that is in the COT, among the candidate time slots as the target time slot. In the third example the SSB transmission by the base station is also limited to a single SSB signal and the UE performs the power measurement only for the target time slot identified among the candidate time slots associated with the configured signal index.

Fourth Example

According to a fourth example, the target time slot is identified (step 320 and step 370) as the candidate time slot for which the power measurement is the highest. Contrary to the first, second and third examples in which the target time slot is identified before power measurement such that power measurement is performed only for one time slot, the target time slot is in the fourth example identified a posteriori, i.e. after power measurement (step 320 and step 370). In this example, the user equipment will perform power measurement within each of the candidate time slots but will wait for the reception of the downlink configuration signal before assessing the link quality or reporting the assessment to the higher level.

If the GC-SFI is not configured to the UE, the UE can rely on another downlink configuration signal, for example a DCI, e.g. UE-specific DCI, cell-specific DCI or other group-common DCI. The proposed solution is as follows: for each DRS window, the UE will perform power measurements within each of the candidate time slots, i.e. for all the SSB index which are QCL related with the configured SSB index. Then the UE selects the highest RSRP as the potential measurement result from this DRS window. When the UE has detected any the above mentioned DCI, e.g. UE-specific, cell-specific, or group-common DCI other than GC-SFI, the measurement result will be made valid, otherwise the power measurement becomes invalid. In the fourth example the SSB transmission by the base station may or not be limited to a single SSB signal, while the UE performs the power measurement for all candidate time slots associated with the configured signal index.

In the above description, the mobile telecommunication system is a 5G mobile network comprising a 5G NR access network. The present example embodiment is applicable to NR in unlicensed spectrum (NR-U) and also to NR in licensed spectrum (NR). The present disclosure can be applied to other mobile networks, in particular to mobile network of any further generation cellular network technology (6G, etc.).

A list of acronyms used in this document is provided below

| Acronym | Meaning |
| --- | --- |
| BS | Base-station |
| CORESET | Control Resource Set |
| COT | Channel Occupancy Time |
| DMRS | DeModulation Reference Signal |
| LBT | Listen Before Talk |
| LTE | Long Term Evolution |
| LTE-A | Advanced long term evolution |
| MIB | Master information block |
| NR | New Radio |
| NR-U | New Radio-unlicensed |
| PBCH | Physical Broadcast Channel |
| PDCCH | Physical Downlink Control CHannel |
| QCL | quasi co-located |

-continued

| Acronym | Meaning |
| --- | --- |
| SFI | Slot Format Indication |
| SS | Synchronization signal |
| SSB | SS/PBCH block |
| UE | User Equipment |

A person of skill in the art would readily recognize that one or more or all steps of the various methods described herein can be performed by programmed computers.

Herein, some embodiments are also intended to cover program storage devices, e.g., digital data storage media, which are machine or computer readable and encode machine-executable or computer-executable programs of instructions, wherein such instructions are configured to cause the execution of some or all of the steps of said above-described methods by a corresponding apparatus or system. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

Figure 5:
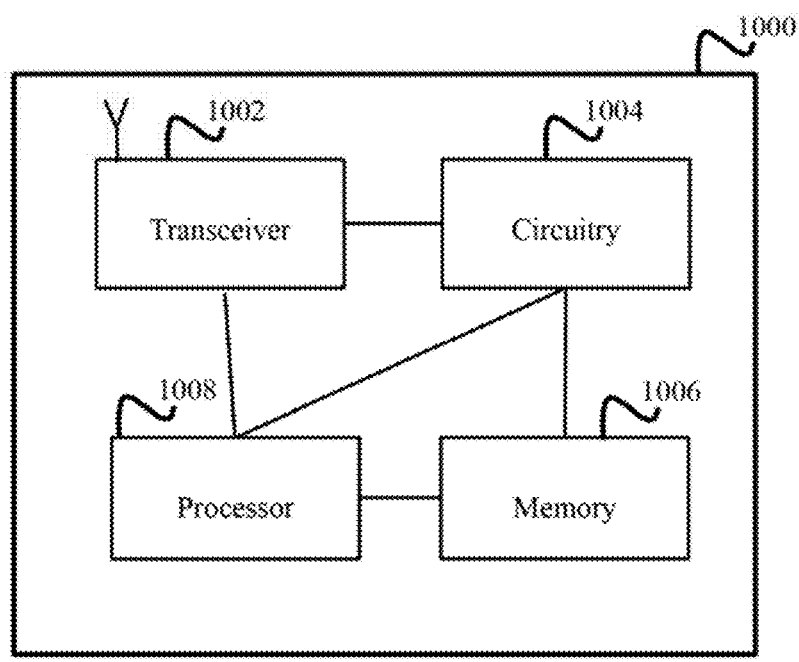
FIG. 5 is a block diagram of a device (e.g., base station or user equipment) according to an example implementation.

For completeness, FIG. 5 shows an example block diagram of a device (e.g. base station or user equipment) 1000 according to an implementation. The device 1000 may include, for example, one or more radio transceivers 1002, where each radio transceiver includes a transmitter to transmit radio signals and a receiver to receive radio signals. The device 1000 also includes a circuitry 1004 (e.g. a processor, control unit/entity, controller) to execute instructions or software and control transmission and receptions of signals, and a memory 1006 to store data and/or instructions. The circuitry 1004 may control the radio transceiver 1002 to receive, send, broadcast or transmit signals and/or data. When the circuitry 1004 is implemented in a user equipment 220 (see FIG. 2) may be configured to measure power of a reference signal received from the base station 210. When the circuitry 1004 is implemented in base station 210 (see FIG. 2) may be configured to control the transmission of reference signal(s) and/or of downlink configuration signal(s).

The circuitry 1004 may also make decisions or determinations, generate frames, packets or messages for transmission, decode received frames or messages for further processing, and other tasks or functions described herein. The circuitry 1004, which may be a baseband processor, for example, may generate messages, packets, frames or other signals for transmission via radio transceiver 1002. The circuitry 1004 may control transmission of signals or messages over a radio network, and may control the reception of signals or messages, etc., via a radio network (e.g., after being down-converted by radio transceiver 1002, for example). The circuitry 1004 may be programmable and capable of executing software or other instructions stored in memory or on other computer media to perform the various tasks and functions described above, such as one or more of the tasks or methods described above. The circuitry 1004 may be (or may include), for example, hardware, programmable logic, a programmable processor that executes software or firmware, and/or any combination of these. Using other terminology, the circuitry 1004 and transceiver 1002 together may be considered as a radio transmitter/receiver system, for example.

In addition, referring to FIG. 5, a processor 1008 may execute software and instructions, and may provide overall control for the device 1000, and may provide control for other systems not shown in FIG. 5 such as controlling input/output devices and/or may execute software for one or more applications that may be provided on device 1000.

The processor 1008 may be configured to store, read, load and/or otherwise process computer program code stored in a computer-readable storage medium and/or in the memory 1006 that, when executed by the at least one processor, causes the device 1000 to perform one or more steps of a method described herein for the concerned device 1000.

The processor 1008 may be any suitable microprocessor, microcontroller, integrated circuit, or central processing unit (CPU) including at least one hardware-based processor or processing core.

The memory 1006 may include a random access memory (RAM), cache memory, non-volatile memory, backup memory (e.g., programmable or flash memories), read-only memory (ROM), a hard disk drive (HDD), a solid state drive (SSD) or any combination thereof. The ROM of the memory 1006 may be configured to store, amongst other things, an operating system of the device 100) and/or one or more computer program code of one or more software applications. The RAM of the memory 1006 may be used by the processor 1008 for the temporary storage of data.

Embodiments of a computer-readable medium includes, but are not limited to, both computer storage media and communication media including any medium that facilitates transfer of a computer program from one place to another. Specifically, program instructions or computer readable program code to perform embodiments described herein may be stored, temporarily or permanently, in whole or in part, on a non-transitory computer readable medium of a local or remote storage device including one or more storage media.

In addition, a storage medium may be provided that includes stored instructions, which when executed by the processor 1008 performs one or more of the functions, steps or tasks described above for the concerned device.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in cooperation with smaller stations and perhaps also employing a variety of radio technologies for better coverage and enhanced data rates.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors, microcontrollers, . . . ) embedded in physical objects at different locations.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

The description and drawings merely illustrate the principles of the disclosure. It will thus be appreciated that those skilled in the art will be able to devise various arrangements that, although not explicitly described or shown herein, embody the principles of the disclosure and are included within its spirit and scope.

Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

What is claimed is:

1. A method for assessing by a user equipment (220) a quality state of a radio link between the user equipment (220) and a base station (210), the method comprising:
   obtaining (300) a signal index that identifies within a reference signal discovery window a plurality of candidate time slots during which a reference signal may be sent by the base station (210);
   determining (310) whether the base station (210) was authorized, as a result of a procedure that determines the availability of a radio channel, to access to the radio channel during at least one first frame, wherein the determination is based on the reception or absence of reception during said at least one first frame of a downlink configuration signal from the base station (210), wherein the downlink configuration signal is a group-common slot format indication (GC-SFI) signal;
   identifying (320), among the plurality of candidate time slots, a target time slot, wherein the target time slot is identified on the basis of a selection indication received with the downlink configuration signal, and the selection indication is an offset indication introduced in the GC-SFI signal, wherein the target time slot is selected among the candidate time slots based on the selection indication after the receipt of the downlink configuration signal; and
   assessing (330) the quality state of the radio link on the basis of a power measurement performed during the target time slot only if the determination is positive.

2. The method according to claim 1, wherein each of plurality of candidate time slots have a same beamforming direction corresponding to the position of the user equipment (220) with respect to the base station (210).

3. The method according to claim 1, wherein identifying the target time slot is performed based on at least one of the downlink configuration signal, a predetermined processing time, the selection indication and a channel occupancy time.

4. The method according to claim 1, wherein when the target time slot selected on the basis of the selection indication occurs before a predetermined processing time has elapsed after the receipt of the downlink configuration signal, the target time slot is the next time slot among the candidate time slots that complies with the selection indication and occurs after a predetermined processing time after the receipt of the downlink configuration signal.

5. The method according to claim 1, wherein the reference signal is a Synchronization Signal/Physical Broadcast Channel block signal.

6. The method according to claim 1, wherein the procedure that determines the availability of a radio channel is a Listen Before Talk or Listen Before Transmit procedure.

7. A device comprising means for performing a method for assessing a quality state of a radio link between a user equipment (220) and a base station (210), the method comprising:
   obtaining a signal index that identifies within a reference signal discovery window a plurality of candidate time slots during which a reference signal may be sent by the base station (210);
   determining whether the base station (210) was authorized, as a result of a procedure that determines the availability of a radio channel, to access to the radio channel during at least one first frame, wherein the determination is based on the reception or absence of reception during said at least one first frame of a downlink configuration signal from the base station (210), wherein the downlink configuration signal is a group-common slot format indication (GC-SFI);
   identifying, among the plurality of candidate time slots, a target time slot, wherein the target time slot is identified on the basis of a selection indication received with the downlink configuration signal, and the selection indication is an offset indication introduced in the GC-SFI signal, wherein the target time slot is selected among the candidate time slots based on the selection indication after the receipt of the downlink configuration signal; and
   assessing the quality state of the radio link on the basis of a power measurement performed during the target time slot only if the determination is positive.

8. The device according to claim 7, wherein the means comprises
   at least one processor (1008); and
   at least one memory (1006) including computer program code, wherein the at least one memory and computer program code are configured to, with the at least one processor, cause the device to perform the steps of the method.

9. The device according to claim 7, wherein the means comprises circuitry configured to perform the steps of the method.

10. A user equipment (220) comprising
    a receiver (1002) configured to receive one or more downlink configuration signals and one or more reference signals from a base station (210);
    a circuitry (1004) configured to measure power of a reference signal received from the base station (210); and
    the device according to claim 7.

11. A method for radio link monitoring by a base station (210), the method comprising:
    configuring (350) a user equipment (220) with a signal index that identifies within a reference signal discovery window a plurality of candidate time slots during which a reference signal may be sent by the base station (210);
    determining (360) whether the base station (210) is authorized, as a result of a procedure that determines the availability of a radio channel, to access to the radio channel during at least one first frame;
    identifying (370), among the plurality of candidate time slots, a target time slot;
    if the determination is positive, sending (380) to the user equipment (220) during said at least one first frame a downlink configuration signal and a selection indication, and sending (390) after the downlink configuration signal a reference signal in the direction of the user equipment (220) only during the target time slot, wherein the downlink configuration signal is a group-common slot format indication (GC-SFI) and the selection indication is an offset indication introduced in the GC-SFI signal.

12. A device comprising means for performing the method for radio link monitoring according to claim 11.

13. A base station (210) comprising
    a transceiver (1002) configured to send one or more downlink configuration signals and one or more reference signals;
    the device according to claim 12.

14. A non-transitory computer readable medium comprising program instructions stored thereon for causing a device to perform the steps of the method according to claim 1.

* * * * *